United States Patent [19]

Belisaire

[11] Patent Number: 4,870,792
[45] Date of Patent: Oct. 3, 1989

[54] PASSAGE OF PRESSURIZED FLUIDS THROUGH MASONRY WORK

[75] Inventor: Daniel Belisaire, Cesson-Sevigne, France

[73] Assignee: Legris SA, Rennes, France

[21] Appl. No.: 141,780

[22] Filed: Jan. 11, 1988

[30] Foreign Application Priority Data

Jan. 12, 1987 [FR] France ................................. 87 00305

[51] Int. Cl.$^4$ ................................................. E04B 5/48
[52] U.S. Cl. ......................................... 52/220; 52/221
[58] Field of Search ........................ 52/220, 221, 169.5; 137/357, 360, 363, 372; 254/134.3 FT, 134.3 PA

[56] References Cited

U.S. PATENT DOCUMENTS

| | | | |
|---|---|---|---|
| 2,665,147 | 1/1954 | Wiesmann | 52/221 |
| 3,097,892 | 7/1963 | Newbury | |
| 3,360,008 | 12/1967 | Papale et al. | 52/220 X |
| 3,670,764 | 6/1972 | Tindal | 52/220 X |
| 3,676,967 | 7/1972 | Frati | 52/220 |
| 4,541,615 | 9/1985 | King, Jr. | |
| 4,569,833 | 7/1985 | Weis | 52/221 X |

FOREIGN PATENT DOCUMENTS

0085329 8/1983 European Pat. Off. .
0191309 8/1986 European Pat. Off. .

*Primary Examiner*—David A. Scherbel
*Assistant Examiner*—Creighton Smith
*Attorney, Agent, or Firm*—Oblon, Spivak, McClelland, Maier & Neustadt

[57] ABSTRACT

Disclosed is an improvement to the passage of pressurized liquids through masonry work using hollow plastic material boxes (17) embedded in pairs in a masonry work (2) and connected together by sheaths (3) also embedded in the masonry work (2) and fixed to the boxes (17). The pressurized liquid plastic material pipes (4), pass through the masonry work (2) through boxes (17) and sheaths (3) in which they are installed by axial sliding motion with diametrical play. The boxes (17) have wheels with a curved profile (11, 13) which hold each pipe (4) in position and bend it while it is guided laterally in a deep grooved curved over a ¼ of a circle (17i), without friction. With rolling contact of the pipe (4) on the wheels (11, 13), the pipes (4) pass through and are bent from the horizontal position to the vertical position with a minimum axial thrust. Through the free rolling of the wheels (11, 13), it is easy to install them or change them. The boxes are sealed with respect to liquid cement.

10 Claims, 5 Drawing Sheets

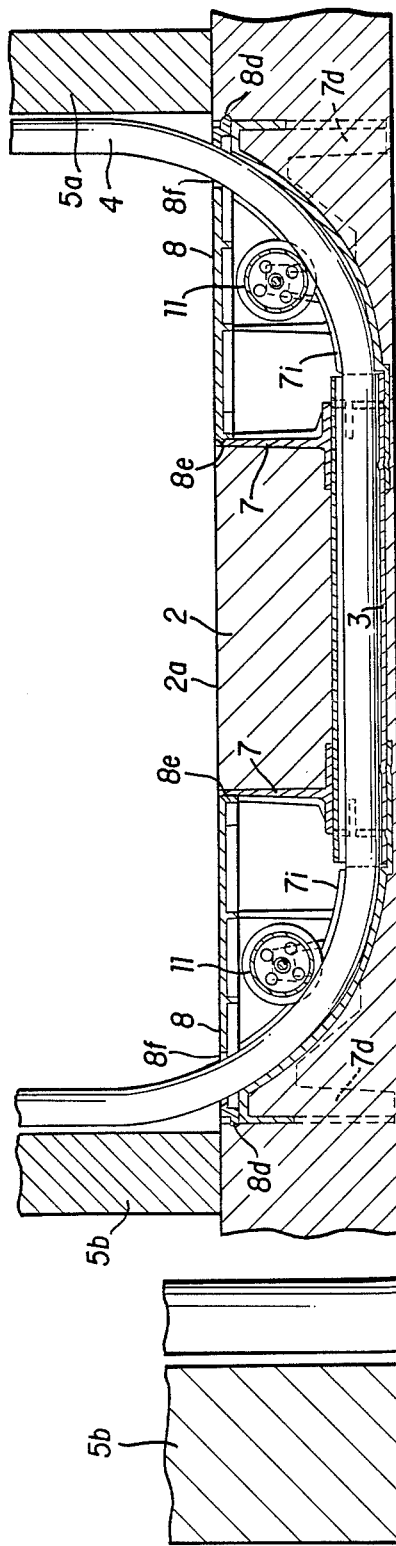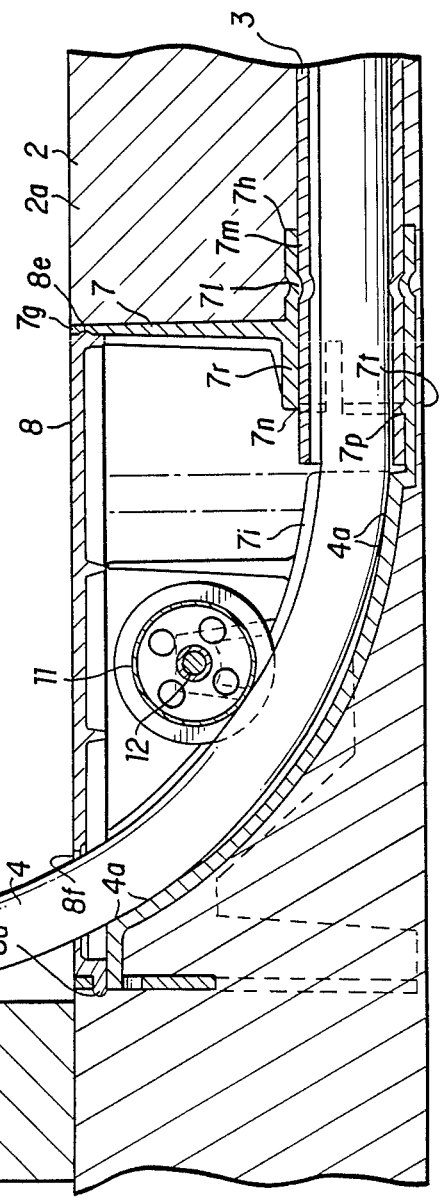
FIG. 7
FIG. 6

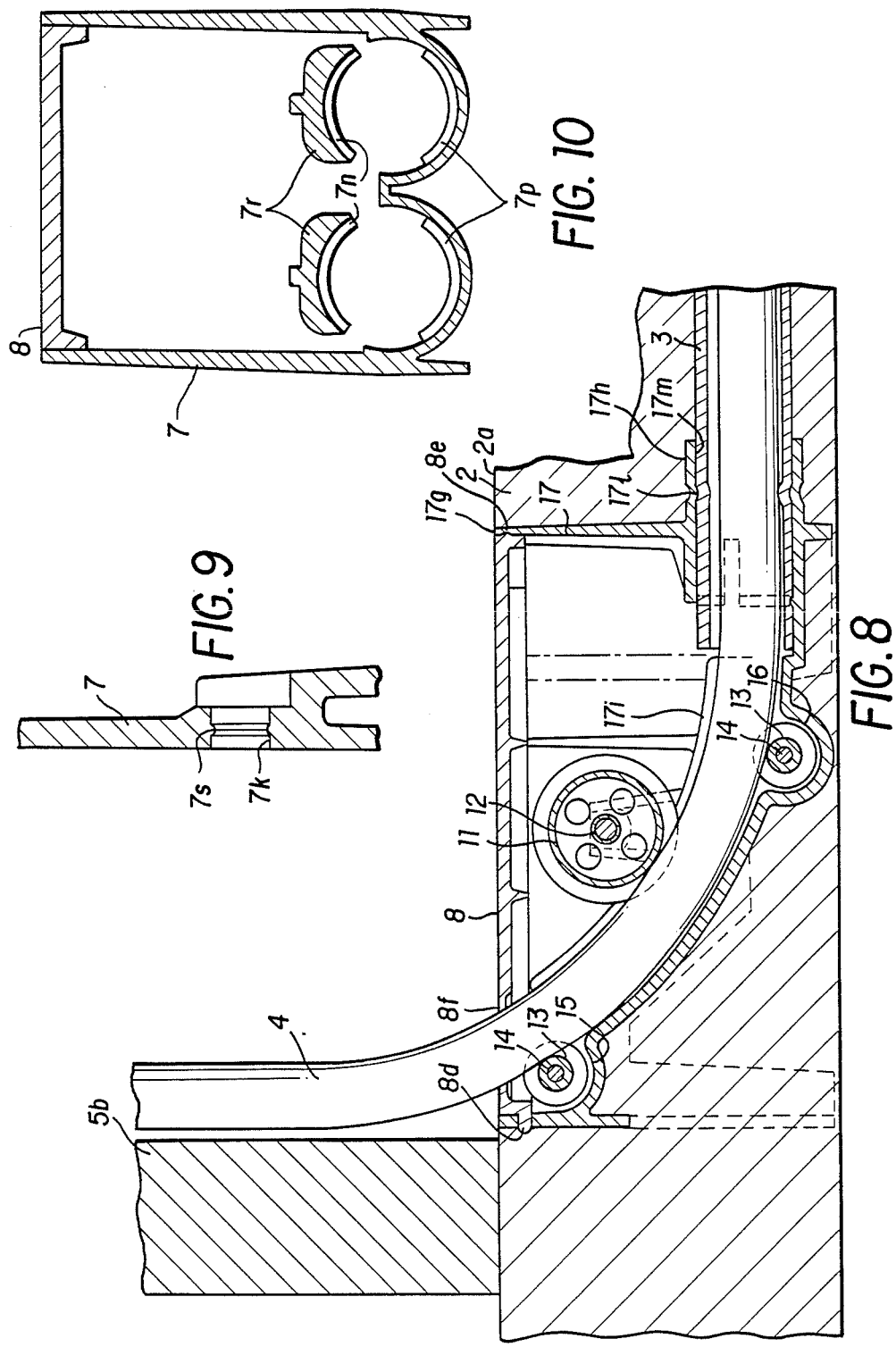

PASSAGE OF PRESSURIZED FLUIDS THROUGH MASONRY WORK

BACKGROUND OF THE INVENTION

1. Field of the Invention:

The invention relates to different boxes to be embedded in masonry work and intended to make it easy and inexpensive to insert plastic tubes for pressurized fluids, during the first installation and the future maintenance thereof.

2. Discussion of the Background:

For passing electric wires through walls, floors and ceilings, there exist very many sorts of boxes, embedded in the masonry and connected together by plastic sheaths, also embedded. The wires pass from one box to the other. Generally, the boxes have a removable lid flush with the masonry work which allows access to the wires for inserting them or changing them.

In the distribution of sanitary water where plastic tubes are used more and more widely, similarly to electricity, it is absolutely necessary to insert these tubes through the masonry work.

In fact, these tubes are unaesthetic and are greatly deformed by expansion. It is therefore necessary to hide them and to pass them therethrough over the shortest path so as to economize as much as possible on the length, for the purpose of using them is a considerable lowering of the sanitary or industrial plumbing cost.

It is also necessary to be able to pass them and possibly change them in the case of damage. Whence it is necessary to slide them through appropriate sheaths, each ending in boxes embedded in the masonry work. The boxes must hold the sheath firmly in position while the cement or plastic is cast and withstand the forces to which the equipment is subjected on a construction site.

The field of use of the invention is more particularly the distribution of sanitary water, but it also finds applications in industry, laboratory, or agricultural fields as well as in the distribution of gases through plastic pipes.

There exist few types of boxes for sanitary plastic pipes, for the technique of distributing water in flats through plastic pipes is only just beginning in a serious way, and before, was only on a private level.

SUMMARY OF THE INVENTION

The invention relates to floor or ceiling boxes leading the pipe substantially perpendicularly to the floor or the ceiling so that it then rises to a sanitary appliance or to a hot water radiator. Often there are 3 to 6 m and even up to 10 m of pipe to be pushed into the starting box as far as through the arrival box. Now, the great difficulty met with in this type of box is that the sanitary pipe is not very flexible and great hardness upon bending may occur. It has to make two bends of radii which are too small for its hardness, one at the inlet in the first box and the other at the outlet in the second box. These problems are never encountered with electricity where flexible material is pulled by means of a wire. Furthermore, the heights of the cement flags 16 cm, 8 cm (generally), 4 cm (rare) only allow very limited radii of curvature but not normal radii of curvature and that makes passage very difficult and substantially impossible with present day boxes.

In the present day box, it is impossible to insert the tube when the box is embedded. It must be done before cementing, which is unpractical.

It may be thought that a box having a bent channel would let the pipe pass easily. Tests show that this is not the case and the force required is even greater, because of the friction exaggerated by too sharp of a bend in the pipe. Another considerable drawback is that the box often projects from the floor, which prevents the latter from being smoothed with a usual machine (called a helicopter) thus resulting in a great waste of time.

Another drawback is that once embedded in the concrete the boxes are totally inaccessible, or opening thereof is so restricted that access thereto is of no real avail for pulling the pipe.

The box of the invention overcomes all the drawbacks of inserting a plastic water pipe which is too stiff.

The box of the invention combines some or all of the following characteristics:

1. It has a sharp tooth portion, with a sector of controlled rigidity, for instantaneously catching on the plastic sheath, 2. It is sealed, as well as the plastic sheath, against the cement or cement wash, 3. It is molded in the cement flooring flush with said flooring, without any projecting part, which makes it possible to smooth the flooring using conventional means without wasting time.

4. It allows the passage of the water pipe after all the masonry work has been finished, with a moderate force, 5. It includes a smooth and polished groove for guiding the water pipe, requiring little force and causing no deformation of the tube.

6. It has at the bottom of the groove a grooved wheel providing veritable bending of the plastic pipe without deformation thereof and without friction, by rotation, using a new technique which is the reverse of the conventional wheel method of bending copper pipes, the force for passing the plastic pipe being reduced by about half, 7. It further comprises two supporting wheels which overcome the two contacts and friction of the water pipe with the groove, which reduces as much as possible, by about three quarters, the force required for passing the plastic pipe.

8. It is completely covered by a removable lid giving perfect and total access to the box and making it monitor and assist the passage of the plastic pipe. With the lid being flush with the flooring and the box not projecting, the flooring may be smoothed using normal methods.

9. The lid has one or more oval apertures to be cut out, prepared for this purpose for the outlet of the water pipe or pipes, or for their inlet.

10. It generally has two passages side by side for the water pipes, for leading the hot water and the cold water to a sanitary appliance, or to provide the supply of water and its return to a heating radiator, or to lead any two cold or hot water pipes from one point of an accomodation to another point in this accomodation. The box may of course be designed for a single water pipe, as it may also be provided for more than two pipes, six passages appearing a reasonable limit for plastic molding of the box.

11. It has fixing holes for firmly fixing it by means of wires to the reinforcement grid of the concrete flooring, so that it does not move during casting of the concrete of the flooring.

12. With its lid it has a height equal to or less than that of the flooring and it is wedged if required to arrive at a height flush with the flooring since it has feet with indentations for letting the concrete pass below.

13. It has a mechanical strength such that it withstands the pressure of the concrete during casting, the forces to which it may be subjected on the site and the weight of a very heavy person who walks on the lid after molding.

14. The top of the lid is covered with a self adhesive paper strip which protects it from the cement and, once removed after molding, will provide a very clean and very readable lid easy to remove.

15. The lid is inserted on the outlet or inlet side of the tubes, which guarantees high strength, and snap fits through notches on the other side. An indentation, shown by a large arrow, makes it possible, simply using a screw driver as a lever, to release the lid which pivots and can be then readily removed. The lid cannot be fitted in the reverse direction because of its embedded feet.

In case of trouble, even with the lid fitted and covered with tiling or carpeting, it is still possible to change a water pipe.

The boxes of the invention are always associated in twos in the same flooring: an inlet box and an outlet box for the water pipe or pipes, the two boxes buried in the masonry work being connected together by one or more sheaths, also sunk in the masonry work. The sheaths are formed of a thick plastic tube, perfectly smooth on the inside and very strong, for withstanding the crushing forces and, in particular, the weight of a heavy person who may walk over said sheaths without hindering the passage of the water pipes. The sheaths form the fixed guides making it possible at any time to withdraw the water pipe and replace it with a new one. An appreciable sliding clearance is provided between the sheath and the special plastic water pipe, so as to provide easy insertion of this latter in the sheath. The internal diameter of the sheath is greater than the maximum ovalization size of the water pipe for the smallest bending radius possible. Of course, pipes which are much finer than the sheath pass without difficulty. The plastic material of the sheaths must be flexible enough to be capable of accepting "normal" radii of curvature depending on the diameter used, and rigid and thick enough so that a person may walk thereon without seriously deforming them.

Its low surface hardness means that it can be engaged by a sharp tooth disposed in the plastic box.

Between the sheath and the box, there is no part which may engage or retain the water pipe and prevent it from passing, since only a smooth and polished continuity with polished radii exists.

Since the boxes of the invention are built into the masonry work with their connecting sheaths, it is only at the normal finishing stage of the plumbing that the hot and cold water sanitary network for the heating radiators will be passed, in a much shorter time with respect to conventional plumbing using metal tubes. The costs of installing the sanitary system are very much reduced, by about half, using plastic materials instead of copper, and the enormous saving in time installing the pipes: the latter being inserted by unqualified labor which is cheap, for there is no need for welders since there is no welding required. The tubes are simply fitted into quick fit connections which require no screwing or welding, but are simply pushed firmly to the bottom of the holes specially provided for them. Without the boxes, which form the subject of the invention, which lead the water pipes to below each sanitary appliance, the installation would be neither rapid, nor reliable nor even really possible from the economic point of view.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a sectional view of the box of FIG. 3 or of FIG. 4, along the axis of a passage;

FIG. 7 is a sectional view, through the axis of a plastic water pipe, of two boxes of the invention embedded in a concrete floor;

FIG. 8 is a sectional view, along the axis of a passage, of another box of the invention;

FIG. 9 shows in section the detail of the boxes of the invention;

FIG. 10 is a sectional view showing the detail of the sharp engagement edges of the connecting sheaths;

DESCRIPTION OF THE PREFERRED EMBODIMENTS

Figure 1:
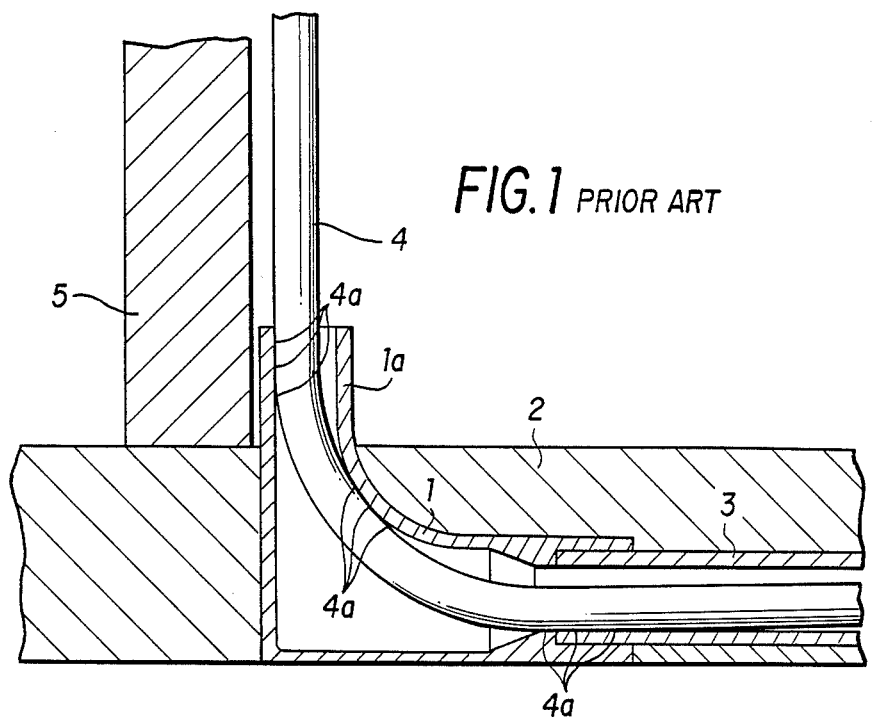
FIG. 1 is a sectional view of a known box.

In FIG. 1, the existing technique is shown: a hollow box 1 made from a plastic material is embedded in the concrete floor as well as a sheath 3 made from a plastic pipe fitted or bonded to box 1. A special plastic water pipe 4 passes through the floor 2 through sheath 3 and box 1 and rises along a dividing wall 5. Box 1 projects from floor 2 at 1a. Pipe 4 has great stiffness and it is practically impossible to install it through the box 1 embedded in the flooring 2. It is therefore installed before casting the floor, which is very troublesome for the masonry work operations. The projection 1a of box 1 as well as of tube 4 prevent the passage of the machine (i.e., referred to as a helicopter) for levelling the cement cast 24 hours before. There are furthermore three contact zones 4a causing a great friction force which hinder and make it almost impossible to slide the tube 4 (which is required for placing it). Since the boxes are always associated in twos, that makes six contact zones 4a which resist the movement of tube 4. There is a great waste of time and money in the masonry work which cancels out the economies in using a plastic material pipe 4. This system is not suitable.

Figure 2:
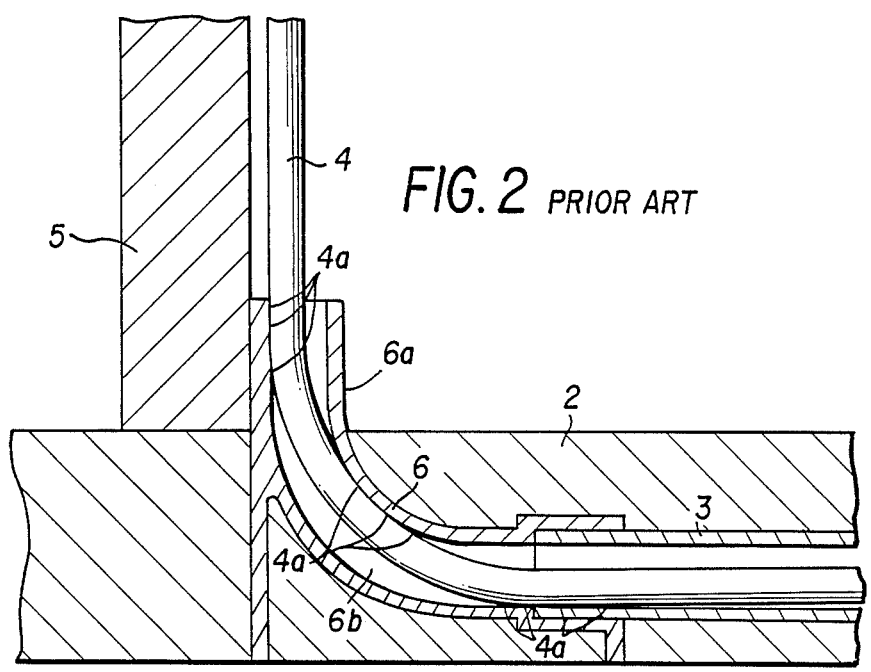
FIG. 2 is a sectional view of another known box.

In FIG. 2, a box 6 has been shown having a smooth bent channel 6b of circular section, guiding pipe 4 and which seems easy to use. In practice, such is not the case for the water pipe 4 has again (as in FIG. 1) three contact zones causing considerable friction 4a due to the spring force of the pipe passing through. The association of the inlet and outlet boxes of the floor 2 then increases to six high friction zones the force required for sliding pipe 4. As in FIG. 1, it is almost impossible to pass pipe 4 after the floor has been cast since it is much too hard.

Figure 3:
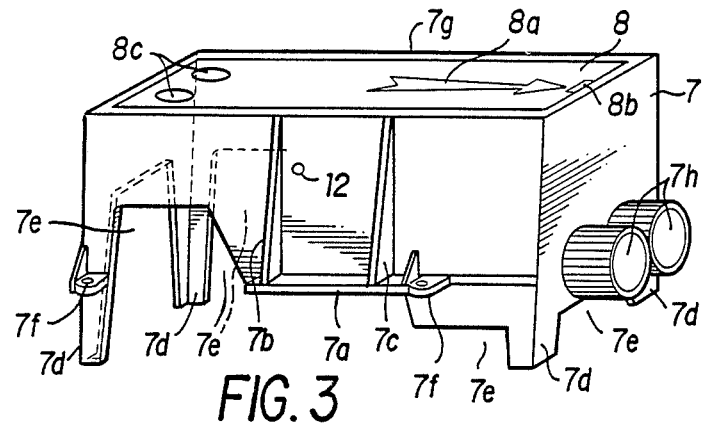
FIG. 3 is an isometric projection of the box of the invention with four passages.

In FIG. 3, a box 7 of the invention is ready to be embedded in the concrete of the masonry work. Its external shape is almost a parallelepipedic reinforced by ribs 7b, 7c. Box 7 has four feet 7d and wide indentations 7e allowing the concrete to pass therebelow so as to lock it in position. Four holes 7f make it possible to fix box 7 to the steel reinforcement of the floor so as to hold it firmly during casting of the cement. The top 7g of the box, provided to be flush with the surface of the cement 4, has an opening lid 8 forming the whole surface of the box 7 and has a large indicator arrow 8a whose tip indicates a recess 8b which is intended for removing lid 8 by simply levering with a screwdriver, said lid being snap fitted on box 7. Lid 8 has two weakened portions 8c to be broken, after box 7 has been embedded in the masonry work, for forming water pipe inlet and outlet passages. Two special connection stubs 7h, having an inner surface 7m and an indentation 7l, are intended to receive the sheaths (thick plastic pipes) which, also buried in the masonry work, will connect two identical boxes together, one at the inlet and one at the outlet in the concrete flooring. The water pipes pass through box 7 from stub 7h to weakened portion to 8c following a curved path special to the invention. They may convey hot or cold water towards one or two sanitary taps (i.e., wash basin - bath), or form the outgoing and return paths towards a water heating radiator or towards two cold water circuits or two hot water circuits. The inner circuit can be seen in section in FIG. 6. The box is sealed from the liquid cement.

Figure 4:
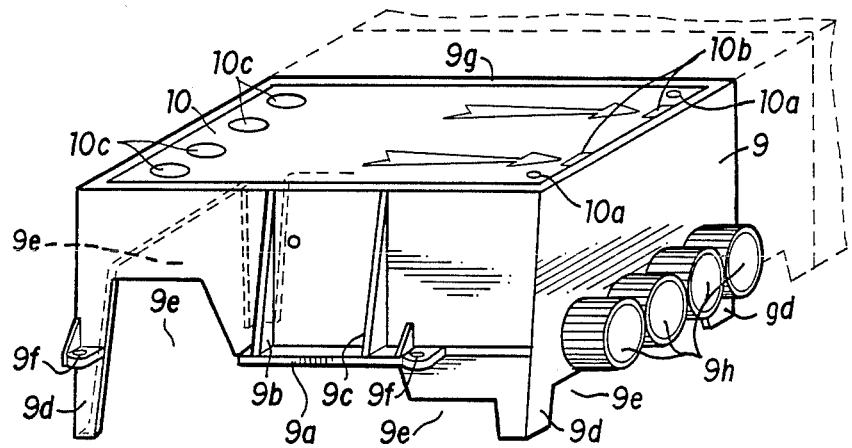
FIG. 4 is an isometric projection of the box in an alternate embodiment.

In FIG. 4, a box 9 of the invention has four water pipe passages instead of two. The elements of this box correspond to those of FIG. 3, and include ribs 9b, 9c; feet 9d, indentations 9e; holes 9f; top 9g; stubs 9h; opening lid 10; large arrow 10a; recess 10b; and weakened portions 10c. The possibility of having one box with six water pipes has been shown with broken lines, which seems a maximum for the plastic molding of said box. The immense lid is provided with two fixing screws 10a for greater safety. Two recesses 10b make it possible to remove the lid using a screwdriver.

Figure 5:
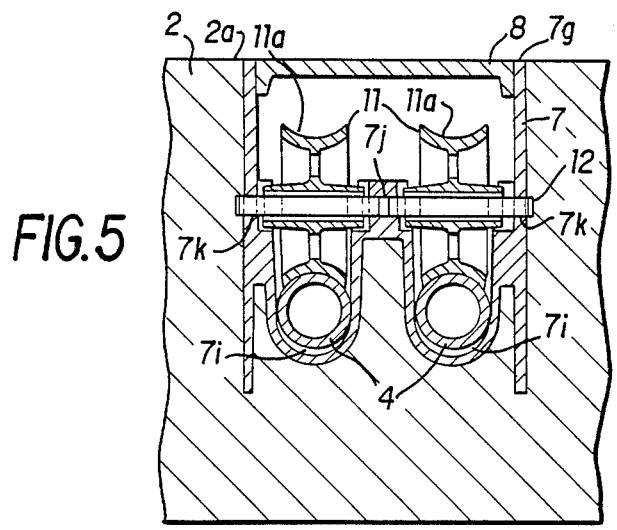
FIG. 5 is a sectional view of the box of FIG. 3, through line C-D of FIG. 6.

In FIG. 5, box 7 is buried in a concrete floor. The section, through the axis 12 of the bending wheels 11, shows the deep grooves 7i for guiding the water pipes 4 which are held therein without touching the bottom thereof, by said bending wheels 11. These latter have circular annular profiles 11a. By rotating, they avoid any frictional contact. The wheels 11 rotate very freely on their shaft 12. Thus, one of the fundamental points of the invention is avoidance of the main friction acting on the water pipes 4 by using a perfectly free frictionless rolling. It will be seen in FIG. 6 that this rolling provides veritable bending of the plastic pipe following a completely new method as applied to this type of box. The shaft 12 of the wheels 11 have three holding points: two bearings sealed to the cement 7k, FIG. 9, and a central bearing 7j snap fitted on the shaft. Each wheel 11 is independent and held securely in position between two bearings 7k and 7j, so as to withstand the considerable bending forces which the water pipe 4 exerts on passing through the box 7.

In FIG. 6, it can be seen that the lid 8 of box 7 covers the whole of this latter flush with the level of the top of floor 2. It can be seen that sheath 3 for guiding pipe 4 is pushed home in the guide 7m of the box. The plastic sheath 3 has a point for sealing with respect to the liquid cement at 7l where the box exerts a slight resilient clamping force on sheath 3, itself deformable. Sheath 3 is positively clamped to box 7 by sharp teeth 7p and 7n. The teeth 7p are formed in fixed cradles 7t integral with box 7 whereas teeth 7n are formed in resilient sectors 7r exerting a strong clamping force on sheath 3 so that it withstands tearing out during the operations for casting the cement floor 2. The details of 7r, 7n, 7p can be seen in FIG. 10. Also in FIG. 6 can be seen the deep groove 7i (also shown in FIG. 5) which extends sheath 3 through ¼ of a circle so as to bring tube 4 from the horizontal position to the vertical position, along the dividing wall 5b. The plastic bottom of groove 7i is glazed so as to reduce as much as possible the two friction points of pipe 4 on box 7 in contact zone 4a with the two ends of groove 7i. In the middle part of groove 7i, the pipe is held away from the bottom by wheel 11 which establishes a free rolling contact (without friction) on pipe 4. Thus, in the invention, the central friction has been completely eliminated which was visible in the conventional solutions shown in FIGS. 1 and 2. The use of an open groove 7i and a wheel 11 reduces by half the force for passing the tube, making passing of the tube quite possible. The solution having a single wheel, this being the most economical, is quite acceptable. The system, which requires that the water pipe 4 be "pushed" through the box, forces the pipe to bend through a much smaller radius than the radius of the wheel from which it is taken. True original bending of the plastic pipe is thus provided and the pipe leaves the box bent. The fixed path for pipe 4 (groove 7i) and the wheel 11 with fixed shaft 12 and the means for axially moving the pipe form, at least in a box, a new and original method for bending a plastic material pipe. Conventional systems on the contrary use a fixed tube, a fixed half round support inside the curvature and a mobile wheel describing a circle outside the pipe about the inner support, forcing the fixed tube about the central support: this is the conventional commercial tool for bending tubes. Pipe 4 is only passed after the masonry work is completely finished, from which nothing projects. Floor 2 remains perfectly smooth and free of projections.

FIG. 7 will now be examined which explains the fitting through a floor 2 from one point to another in this floor 2.

Two cases 7 are connected together by a plastic material connecting sheath 3 fixed to the two boxes, said sheath 3 being also embedded in floor 2 and serving as path with wide clearance for the plastic pipe 4 which, passing horizontally through the floor 2 through said sheath 3, is forced by the boxes 7 to rise perpendicularly to the floor 2 along vertical dividing walls 5a and 5b. Pipe 4 also passes through the lids 8 of boxes 7 through oval apertures 8f, as clearly shown in FIG. 6. Through these oval apertures 8f it is possible to remove and change pipe 4 for maintenance without removing the lids 8 from the two boxes 7, one of which is the starting box and the other the arrival box, despite the fact that they are identical.

For first fitting pipe 4, the lids 8 are removed using a screwdriver so as to pass the pipe 4 conveniently. Then, the weakened portions 8c of the lid (FIG. 3) are removed with a screwdriver or knife. Lastly, pipe 4 is threaded through apertures 8f in lids 8 which are then replaced by, first of all, fitting the holding lugs 8d into the boxes 7 and by closing down the lids until they are locked on box 7 in the recesses 8e shown in FIG. 6. The size of lids 8 which cover the whole surface of boxes 7 is determined so as to provide total and practical access to the inside of said boxes. After the first fitting of pipes 4, even if the floor 2 is covered with tiles or carpeting, it is possible to readily change a platic pipe should the need arise without opening lid 8.

In FIG. 8, a box 17 of the invention has three wheels elminating all frictional contact of pipe 4 in box 17 and has stub 17h, inner surface 17m and indentation 17d. Wheel 11 and its shaft 12 form the bending wheel which, as in FIG. 6, overcomes the main friction and replaces it by free frictionless rotation. Wheels 13 having profiles identical or close to that of wheel 11 and their shafts 14 are placed in recesses 15 and 16 with a clearance being provided. The wheel projects very slightly from groove 17i for supporting pipe 4 and eliminating all frictional contact with groove 17i at both its ends, at contact zone 4a in FIG. 6, said friction being replaced by free rotation. Thus, box 17 is the most improved box of the invention, for by overcoming all friction it allows pipe 4 to be passed with the minimum of axial sliding force. A comparison between FIG. 8 and FIGS. 1 and 2 illustrating the techniques used at the present time show the great progress of the invention which overcomes all frictional contacts. The type of box 17 shown in FIG. 8 will be most useful with the largest pipes 4 and the most stiff to pass. For finer and more flexible pipes, the boxes 7 of FIG. 6, the more economic, may be sufficient. Except for the wheels and their housing, box 17 is identical to boxes 7 of FIGS. 3, 4, 5, 6 and 7. The axial force required for passing the pipe through box 17 is reduced by about ¾ with respect to FIGS. 1 and 2.

FIG. 9 shows the details of the bearing 7k shown in FIG. 5 and of the sealing of shaft 12 with respect to the cement. Shaft 12 of wheels 11 is mounted with play in bearing 7k, but a small circular collar 7s exerts a slight clamping force on shaft 12, so as to guarantee sealing of the shaft of the wheels with respect to the liquid cement and to provide good rotation thereof.

In FIG. 10 can be seen the details of the sharp edges 7p and 7n for engagement with sheaths 3, also shown in FIG. 6. These edges form part of box 7 and are integrally molded therewith. The sharp teeth 7a (FIG. 6) are fixed and form a sector which penetrates into the sheath 3. The sharp teeth 7n form a sector carried by a resilient element 7r in the form of a free but sufficiently stiff beam for supporting the tolerances of sheath 3 and penetrating slightly into sheath 3 and engaging it positively and against tearing away to withstand the operations for casting the cement on the worksite.

Figure 11:
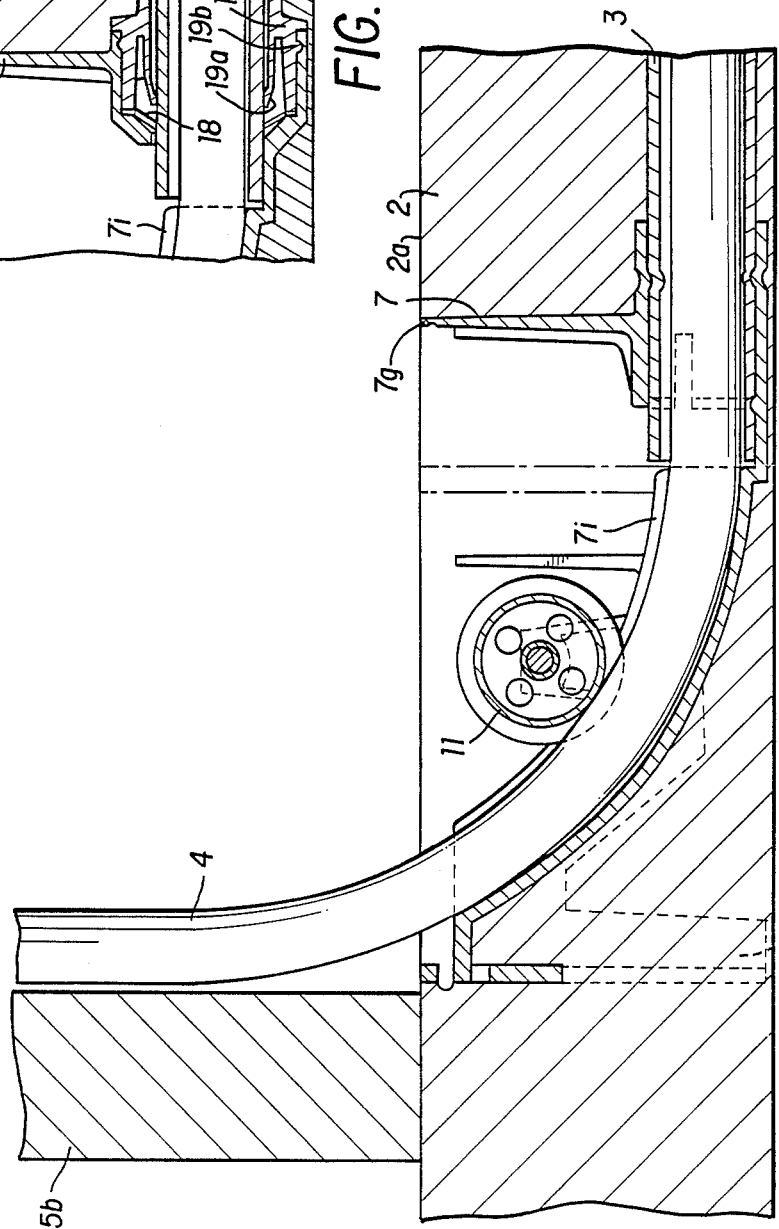
FIG. 11 is a view similar to FIG. 6, the box being embedded in a concrete floor.

In FIG. 11 lid 8, shown in FIG. 6 (of box 7) has been removed, showing an opening for access to the inside as large as the box 7 and total access for observing and checking the correct passage of the water pipes 4, either the first time they are installed or when they are changed.

Figure 12:
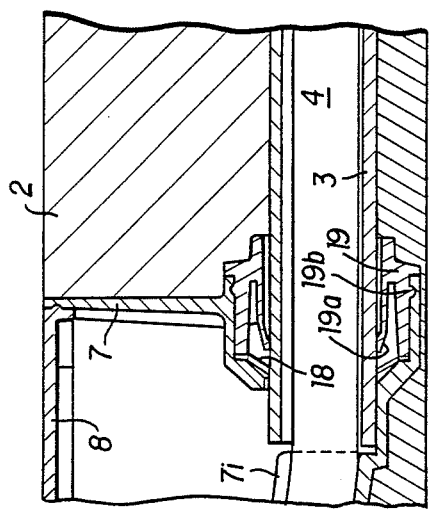
FIG. 12 is a sectional view showing a variant of the sealed connecting system on the box for a connecting sheath.

FIG. 12 is a variant of sealing with respect to the liquid cement and the holding of sheath 3 on box 7. Sheath 3 can be seen held by two accessory pieces: piece 19 made from a semiflexible plastic material having a flexible sealing lip 19a snap fitted at 19b on the body; and a piece 18 which is a stamped spring steel washer of the TRUARC or NOMEL ring type and which holds sheath 3 in position to prevent it being torn away. The system has the advantage of accepting wide tolerances with respect to the diameter of sheath 3. The fitting of the sheath is instantaneous by a simple fitting procedure.

The protective strip on the top of the lid, which is intended to be brought down over both ends to cover the lugs 8d of lid 8 (FIG. 6) and all the clearances between lid 8 and box 7 has not been shown in the drawings. The protective strip is provided for protecting the lid from the cement and keeping it very clean and easily removable. The protective strip is removed before passing the plumbing pipes 4; it is necssary and forms part of the invention.

The invention shows the plastic material boxes embedded in the masonry work so as to facilitate passing of the plastic pipes and the advent of a new type of plumbing using entirely plastic pipes. The invention is not limited to the boxes described but to all types conforming to the invention.

The invention does not apply only to the use for water, sanitary and heating systems, but also to many industries such as the building of factories, offices, laboratories and also for the transport of all tubes through plastic pipes passing through floors, masonry work ceilings, but also for liquids such as gases in the mechmanical, food, chemical, oil, agricultural industries etc. The invention brings an appreciable lowering of the costs of installing plastic pipes in all buildings.

Obviously, numerous modifications and variations of the present invention are possible in light of the above teachings. It is therefor to be understood that within the scope of the appended claims, the invention may be practiced otherwise than as specifically described herein.

What is new and desired to be secured by Letters Patent of the United States is:

1. A box assembly for the passage of pressurized liquids through masonry work, which comprises:
    a plurality of boxes embedded in pairs in the masonry work;
    a plurality of sheaths disposed in the masonry work and interconnecting said boxes;
    a plurality of pipes respectively positioned in said sheaths for transporting pressurized liquids through said masonry work,
    said boxes having an inlet and outlet for said pipes and said boxes having a parallelepipedic shape with a top portion flush with a surface portion of the masonry work, a rectangular lid flush with said top portion and having a plurality of removable weakened portions, wherein side portions of the boxes opposite said weakened portions include a plurality of stub members at least equal in number to said weakened portions, wherein each of said stub members comprises a housing for an end portion of each of said sheaths, said boxes including a plurality of curved groove portions extending over substantially ¼ of a circle and which connect together passages formed upon removal of said weakened portions; and
    a freely rotatable wheel which has a profile for substantially matching a peripheral portion of said pipes and for positioning said pipes at a bottom portion of said groove.

2. A box assembly according to claim 1, which comprises an additional wheel positioned at opposite ends of said grooves and which has a curved profile for substantially matching a peripheral portion of said pipes for minimizing friction between said pipes and said grooves.

3. A box assembly according to claim 2, wherein the additional wheels of each of said grooves are mounted on shafts which pass through said boxes over a width portion of said boxes.

4. A box assembly according to claim 3, which comprises clamping means positioned at an inlet portion of the sheaths and a sealing collar for clamping the shafts of the wheels in position and form a seal.

5. A box assembly according to claim 4, wherein said side portions have fixing holes formed therein for immobilizing said boxes in a predetermined position during molding of the masonry work.

6. A box assembly according to claim 5, wherein said side portions include indented lug members of a length corresponding to a thickness dimension of the masonry work.

7. A box assembly according to claim 6, wherein said weakened portions are of a predetermined contour and are adapted for instantaneous removal by breaking.

8. A box assembly according to claim 1, wherein said lid includes at least one safety fixing screw.

9. A box assembly according to claim 1, which comprises means for holding said sheaths in said box and which includes a resilient element and a first and second sector having edges for penetrating a surface portion of the sheaths for immobilizing the sheaths in a predetermined position, the first sector member being fixedly connected on the box and the second sector being mounted on said resilient element.

10. A box assembly according to claim 1, which comprises a metal sheet member connected to said box for holding each of said sheaths in position and a snap fitting member connected to said box and having a lip for engaging each of said sheaths and for providing a seal.

* * * * *